(12) United States Patent
Lin et al.

(10) Patent No.: US 12,061,259 B2
(45) Date of Patent: Aug. 13, 2024

(54) RECEIVING DEVICE FOR AN OPTICAL DETECTION APPLIANCE, DETECTION APPLIANCE AND DRIVER ASSISTANCE SYSTEM

(71) Applicant: Valeo Schalter und Sensoren GmbH, Bietigheim-Bissingen (DE)

(72) Inventors: Lin Lin, Bietigheim-Bissingen (DE); Peter Horvath, Bietigheim-Bissingen (DE); Thomas Schuler, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 1482 days.

(21) Appl. No.: 16/464,033

(22) PCT Filed: Nov. 20, 2017

(86) PCT No.: PCT/EP2017/079768
§ 371 (c)(1),
(2) Date: May 24, 2019

(87) PCT Pub. No.: WO2018/095862
PCT Pub. Date: May 31, 2018

(65) Prior Publication Data
US 2019/0383938 A1    Dec. 19, 2019

(30) Foreign Application Priority Data
Nov. 24, 2016  (DE) ..................... 10 2016 122 645.9

(51) Int. Cl.
*G01C 3/08* (2006.01)
*G01S 7/481* (2006.01)
(Continued)

(52) U.S. Cl.
CPC ............. *G01S 17/10* (2013.01); *G01S 7/4811* (2013.01); *G01S 7/484* (2013.01); *G01S 7/4863* (2013.01); *G01S 17/42* (2013.01); *G01S 17/931* (2020.01)

(58) Field of Classification Search
CPC ........ G01S 17/10; G01S 7/4811; G01S 7/484; G01S 7/4863; G01S 17/42; G01S 17/931; G01S 7/4816; G01S 7/497
See application file for complete search history.

(56) References Cited

U.S. PATENT DOCUMENTS

| 8,810,607 B2 | 8/2014 | van Veenendaal et al. |
| 2010/0157278 A1 | 6/2010 | Horsch et al. |

(Continued)

FOREIGN PATENT DOCUMENTS

| CN | 103415784 A | 11/2013 |
| DE | 4208065 A1 | 11/1992 |

(Continued)

OTHER PUBLICATIONS

German Search Report Issued in Corresponding German Application No. 102016122645, Dated Jul. 12, 2017 (7 Pages).

(Continued)

*Primary Examiner* — Samantha K Nickerson
(74) *Attorney, Agent, or Firm* — Osha Bergman Watanabe & Burton LLP

(57) ABSTRACT

A receiving device for an optical detection appliance for receiving optical reception signals, in particular of a transmitting device of the detection appliance, that are reflected at an object (18), a detection appliance and a driver assistance system are described. The receiving device comprises at least one optical sensor (36) comprising at least one detection surface (38) with at least one row (44) with a number of optical detection regions (40, 42) extending along (Continued)

a first extension direction (46) of the at least one detection surface (38). At least two of the detection regions (40, 42) can be analysed separately from each other for positional resolution of a received signal. The respective extents of at least two detection regions (40, 42) are different, at least when viewed along the first extension direction (46).

6 Claims, 2 Drawing Sheets

(51) Int. Cl.
*G01S 7/484* (2006.01)
*G01S 7/4863* (2020.01)
*G01S 17/10* (2020.01)
*G01S 17/42* (2006.01)
*G01S 17/931* (2020.01)

(56) References Cited

U.S. PATENT DOCUMENTS

| | | | |
|---|---|---|---|
| 2012/0249998 | A1 | 10/2012 | Eisele et al. |
| 2014/0078491 | A1* | 3/2014 | Eisele .................. G01S 7/4863 356/4.07 |
| 2016/0292905 | A1* | 10/2016 | Nehmadi ................ G06T 17/05 |

FOREIGN PATENT DOCUMENTS

| | | | |
|---|---|---|---|
| DE | 10147807 | A1 | 4/2003 |
| DE | 102008061035 | B3 | 6/2010 |
| DE | 102011005746 | A1 | 9/2012 |
| EP | 789283 | A2 * | 8/1997 ......... G03G 15/0194 |
| EP | 2194397 | A1 | 6/2010 |
| EP | 2675152 | A2 | 12/2013 |
| EP | 2686703 | B1 | 7/2018 |
| JP | 2015-152574 | A | 8/2015 |

OTHER PUBLICATIONS

International Search Report and Written Opinion Issued in Corresponding PCT Application No. PCT/EP2017/079768 (17 Pages with Engliosh Translation of Insternational Search Report and Written Opinion).
The Notice of Preliminary Rejection issued in corresponding Korean Application No. 2019-7017818, dated Apr. 27, 2020 (13 pages).
Notification of Reason for Rejection in corresponding Japanese Application No. 2019-527859, dated Jul. 28, 2020 (5 pages).
The First Office Action issued in Chinese Application No. 201780080477.7, dated Sep. 5, 2022 (19 pages).

* cited by examiner

RECEIVING DEVICE FOR AN OPTICAL DETECTION APPLIANCE, DETECTION APPLIANCE AND DRIVER ASSISTANCE SYSTEM

TECHNICAL FIELD

The invention concerns a receiving device for an optical detection appliance for receiving optical reception signals, in particular of a transmitting device of the detection appliance, that are reflected from an object with at least one optical sensor comprising at least one detection surface with at least one row with a plurality of optical detection areas extending along a first extension direction of the at least one detection surface, wherein at least two of the detection regions can be analysed separately from each other for position resolution of a received signal.

The invention further concerns an optical detection appliance with at least one transmitting device for sending optical transmission signals and at least one receiving device for receiving transmission signals reflected from an object as received signals, wherein the at least one receiving device comprises at least one optical sensor comprising at least one detection surface with at least one row with a number of optical detection regions extending along a first extension direction of the at least one detection surface, wherein at least two of the detection regions can be analysed separately from each other for positional resolution of a received signal.

Moreover, the invention concerns a driver assistance system for a vehicle, with at least one optical detection appliance and at least one electronic control device for controlling functional devices of the vehicle depending on information that is provided by the at least one detection appliance, wherein the at least one detection appliance comprises at least one transmitting device for sending optical transmission signals and at least one receiving device for receiving transmission signals reflected from an object as received signals, wherein the at least one receiving device comprises at least one optical sensor comprising at least one detection surface with at least one row with a number of optical detection regions extending along a first extension direction of the at least one detection surface, wherein at least two of the detection regions can be analysed separately from each other for positional resolution of a received signal.

PRIOR ART

A LiDAR system that is known on the market comprises a transmitting device for transmitting optical transmission signals in the form of light. The light is transmitted into a monitoring region in order to monitor said region for objects. If there is an object in the monitoring region, the transmission signals are reflected there. The reflected transmission signals are received as reception signals with a receiving device of the detection appliance. The receiving device comprises a CCD sensor, with which a plurality of rows, each with a number of pixels, are disposed along a detection surface. The pixels each form an optical detection region that can be analysed separately from each other for positional resolution of the received signal.

It is the object of the invention to design a receiving device, a detection appliance and a driver assistance system of the aforementioned type, with which objects can be detected better both at close range, in particular at distances of a few meters, and in the far-field, in particular at distances of up to 100 m and more.

DISCLOSURE OF THE INVENTION

This object is achieved according to the invention with the receiving device as a result of the respective extent of at least two detection regions being different at least when viewed along the first extension direction.

According to the invention, an extent, in particular an area, of at least one detection region is increased compared to at least one further detection region. By increasing the at least one detection region an interfering effect of ambient light on said at least one detection region can be reduced. Thus, overall a signal-to-noise ratio can be improved. With the invention, a signal-to-noise ratio can be improved in particular in relation to ambient light based noise. In this way, the receiving device can be improved for use with LiDAR systems in particular. Overall, the inhomogeneous division of the detection regions according to the invention causes an efficient improvement of the signal-to-noise ratio. Moreover, different resolutions can be achieved by the different extents of the detection regions. With detection regions with small extents, a higher resolution can be achieved than with detection regions of correspondingly larger extent. Overall, with suitable orientation of the at least one detection surface in space both relatively large objects at very large distances, in particular in the far field, and small objects in the near surroundings, in particular in the near field, can each be detected with an optimum signal-to-noise ratio. To detect relatively small objects at relatively short distances, a correspondingly higher resolution is necessary than for larger objects at longer distances.

As a near field in the sense of the invention, in particular shorter distances in the region of a few meters are referred to. The far field refers to longer distances, in particular up to 100 m and more. With the detection appliance according to the invention, both larger objects, in particular vehicles or persons, in the far field and smaller objects, in particular rocks, potholes, water pipes or similar, in the near field can be detected.

Advantageously, with a normal operating orientation of the receiving device the first extension direction is vertical. In this way, a vertical field of view of objects can be monitored with the receiving device. In particular, for use with a vehicle the roadway in the near field immediately in front of the vehicle can be detected with at least one detection region of smaller extent. With at least one detection region with a larger extent the far field can be monitored for larger objects at longer distance.

For use with a vehicle, the orientation of the first extension direction relative to the vehicle can be invariant. Thus, depending on the orientation of the vehicle the first extension direction and the propagation direction for the transmission signal can be moved with the vehicle as a function of the course of the roadway. The detection appliance can advantageously be oriented on the vehicle so that the first extension direction extends spatially vertically with a horizontal roadway profile. The propagation direction for the transmission signal can extend spatially horizontally in this case.

Advantageously, the detection appliance can be a distance measurement system. In this way, a distance of an object can be detected with the detection appliance.

The transmitting device can advantageously comprise at least one light source. With the at least one light source, in particular pulsed transmission beams can be transmitted as transmission signals. With the at least one light source, transmission signals in frequency ranges that are visible to the human eye or that are not visible can be emitted. Accordingly, the at least one receiving device of the detection appliance can comprise at least one sensor that is designed for the frequency of the emitted light.

Advantageously, the detection appliance can be a laser-based detection appliance. With a laser-based detection appliance, the transmitting device can comprise at least one laser as a light source, in particular a diode laser.

The detection appliance can advantageously be a scanning system, in particular a laser scanner. With a scanning system a monitoring region can be scanned in a field of view, in particular with pulsed transmission signals. Alternatively, the detection appliance can be a system that operates with flashes of light, in particular a so-called Flash-LiDAR system. In this case, a field of view can be illuminated with a flash of light and the received signals reflected at any objects can be detected with the transmitting device.

Advantageously, the at least one detection appliance can operate according to a light transition time method. Optical detection appliances operating according to the light pulse transition time method can be designed as and referred to as Time-of-Flight (TOF) systems, Light Detection and Ranging systems (LiDAR), Laser Detection and Ranging systems (LaDAR) or similar. With the light pulse transition time method, a transition time from transmitting a transmission signal, in particular a light pulse, with at least one transmitting device until receiving the corresponding reflected received signal with at least one receiving device is measured and a distance between the detection appliance and the detected object is determined therefrom.

The invention can advantageously be used with a vehicle, in particular a motor vehicle. Advantageously, the invention can be used with a land vehicle, in particular a passenger car, a truck, a bus, a motor cycle or similar, a waterborne vehicle, an aircraft or a combined land vehicle, waterborne vehicle and/or aircraft. The invention can also be used with autonomous or at least partly autonomous vehicles.

Advantageously, the optical detection appliance can be part of or can be connected to a driver assistance system of a vehicle. The information of the optical detection appliance can be used for controlling functional components of the vehicle. With the functional components, in particular driving functions and/or signalling devices of the vehicle can be controlled, in particular a steering system, a brake system and/or an engine or similar. Thus, on detecting an object with the optical detection appliance the vehicle can be steered with the corresponding functional components and/or altered in speed, in particular stopped, and/or at least one signal can be output.

Alternatively or additionally, the optical detection appliance can advantageously be part of or can be connected to a chassis control arrangement of a vehicle. With the chassis control arrangement, a chassis of the vehicle can be adjusted to a driving surface. With the chassis control arrangement an active suspension or an active chassis can be controlled. Thus, on detecting an object, in particular a protrusion from or a depression in the driving surface, with the optical detection appliance in a monitoring region that is monitored with the field of view, the chassis, in particular the suspension can be correspondingly adapted. With the chassis control arrangement, the chassis can be actively adjusted to an occurring situation, in particular unevennesses of the driving surface.

With one advantageous embodiment, the detection surface can be divided into at least two sections, in which signals from objects at different distances from the receiving device can be detected, wherein the extent of corresponding detection regions in the sections for detecting at greater distances can be larger than the extent of corresponding detection regions in sections for detecting closer objects. In this way, resolutions in the sections for detecting closer objects can be higher than resolutions in the regions for detecting objects that are further away. Thus, with the at least one detection region in the at least one section for closer objects, very small objects, in particular rocks, water pipes or similar can be detected. Owing to the increased resolution at the at least one local detection region, correspondingly less ambient light can be detected. As a result, the signal-to-noise ratio can be improved without the received signal being adversely affected. Owing to the lower resolution in the at least one detection region for detecting objects that are further away, the signal-to-noise ratio can be improved for correspondingly longer distances.

With a further advantageous embodiment, the extent of at least one central detection region, which can be disposed near the centre of the at least one detection surface in relation to the first extension direction, can be larger than the extent of at least one edge detection region that can be disposed closer to an edge of the detection surface in comparison to the at least one central detection region. In this way, at least one detection region for detecting objects at longer distances can be disposed in the centre of the at least one detection surface. At least one detection region for detecting objects in the closer surroundings can be disposed in the vicinity of a boundary of the at least one detection region.

With an orientation of the at least one detection region such that the first extension direction runs spatially approximately vertically, at least one edge detection region can be disposed spatially above or spatially below on the at least one detection surface. In particular, with the use of corresponding receiving optics the received light rays from objects at greater distances can be detected in the at least one central detection region. The received light rays from closer objects, which are in particular disposed on the ground, especially on the road surface, can be detected in the at least one edge detection region.

With a further advantageous embodiment, a ratio of an angular resolution in at least one first detection region with a larger extent, in particular a central detection region, to an angular resolution in at least one second detection region with a smaller extent, in particular an edge detection region, can be about between 12 to 1 and 8 to 1, in particular about 10 to 1. In this way, with the at least one first detection region correspondingly large objects can be detected even at long distances. Moreover, with the at least one second detection region smaller objects at shorter distances can also be detected.

By means of a larger angular resolution, the resolution in the corresponding detection region can be reduced. Accordingly, the resolution can be increased by means of a smaller angular resolution.

Advantageously, a plurality of second detection regions, each with reduced angular resolutions, can be provided in order to be able to detect even small objects with an improvement in the signal-to-noise ratio.

Advantageously, an angular resolution in the at least one first detection region, in particular in at least one central detection region, can be about between $0.8°$ and $1.2°$, in particular $1°$. In this way, adequate resolution can be achieved for correspondingly large objects at correspondingly longer distances, in particular in the far field. In particular, in this way larger objects with extents from about 1 m to 2 m, in particular vehicles or persons, can still be detected in the far field at longer distances of between 80 m and 120 m, in particular up to 110 m, with the receiving device.

Advantageously, an angular resolution in the at least one second detection region, in particular in at least one edge detection region, can be between 0.08° and 0.12°, in particular about 0.1°. In this way, small objects at shorter distances, in particular in the near field, can still also be detected. Thus, in the near field, in particular at distances of a few meters, even smaller objects of the order of a few centimetres, in particular rocks, potholes, water pipes or similar on the ground, in particular the road surface, can still be detected with the receiving device.

With a further advantageous embodiment, at least one detection region can be implemented with an image point and/or at least one detection region can be made up of a plurality of image points.

Advantageously, at least one detection region can be implemented with a single image point. In this way, said at least one detection region can be read separately and correspondingly analysed. The image points of different detection regions can have different sizes, so that they can have different extents at least in the first extension direction.

Alternatively or additionally, at least one detection region can be made up of a plurality of image points. In this case the image points can be connected together electrically/electronically and/or analysed using a suitable method, in particular on the processor plane or software plane. In this case the image points can be made up of correspondingly large detection regions as required.

As is well known, image points can be referred to as "pixels".

With a further advantageous embodiment, the at least one optical sensor can be an electrooptical sensor. With an electrooptical sensor, received optical signals can be converted into electrical signals. The electrical signals can be read and/or processed with suitable electrical/electronic control and/or analysis devices.

Advantageously, the at least one optical sensor can be embodied as a CMOS sensor, CCD sensor, photodiode array or similar.

Furthermore, the technical object according to the invention for the detection appliance is achieved in that the respective extents of at least two detection regions are different at least when viewed along the first extension direction.

Advantageously, the detection appliance can comprise at least one in particular electrical/electronic control and/or analysis device which can analyse environment information, in particular information about a detected object, that is controlled by the detection appliance and/or that is detected with the detection appliance.

Advantageously, the at least one control and/or analysis device can be connected to at least one in particular electrical/electronic control device of the driving assistance system. In this way, the driver assistance system can control corresponding functional devices of the vehicle based on the information detected with the detection appliance.

Moreover, the technical object according to the invention for the driver assistance system is achieved in that the respective extents of at least two detection regions are different at least when viewed along the first extension direction.

Other than that, the features and advantages indicated in connection with the receiving device according to the invention, the detection appliance according to the invention and the driving assistance system according to the invention and the respective advantageous embodiments thereof correspond to each other and vice-versa once the necessary changes have been made. The individual features and advantages can of course be combined with each other, wherein further advantageous effects can be used that go beyond the sum of the individual effects.

BRIEF DESCRIPTION OF THE DRAWINGS

Further advantages, features and details of the invention result from the following description, in which an exemplary embodiment of the invention is described in detail using the drawing. The person skilled in the art will also advantageously consider the features individually disclosed in the drawing, the description and the claims in combination and will combine them into further meaningful combinations. In the FIGS.

In the figures identical components are provided with the same reference characters.

EMBODIMENT(S) OF THE INVENTION

Figure 1:
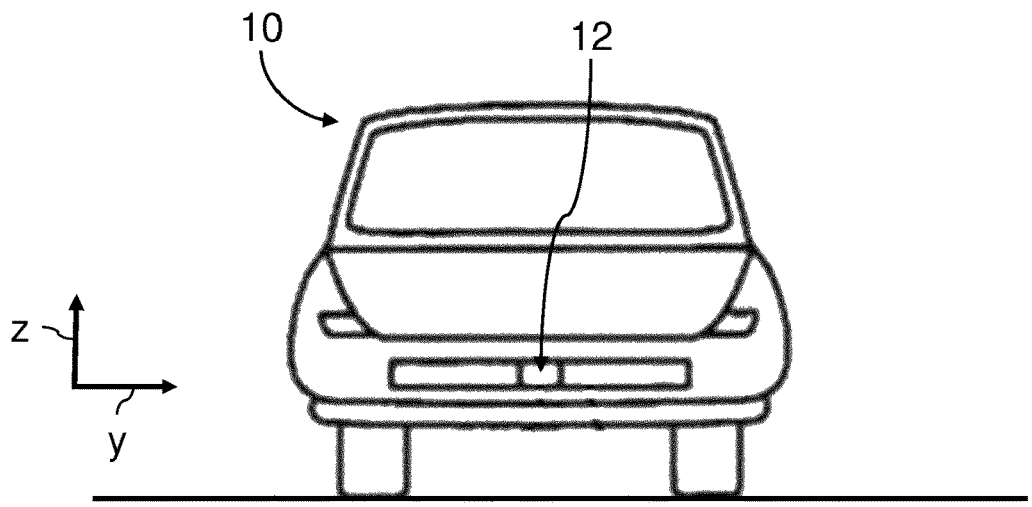
FIG. 1 shows schematically a motor vehicle in the frontal view that comprises a driver assistance system with a LiDAR system.
Figure 2:
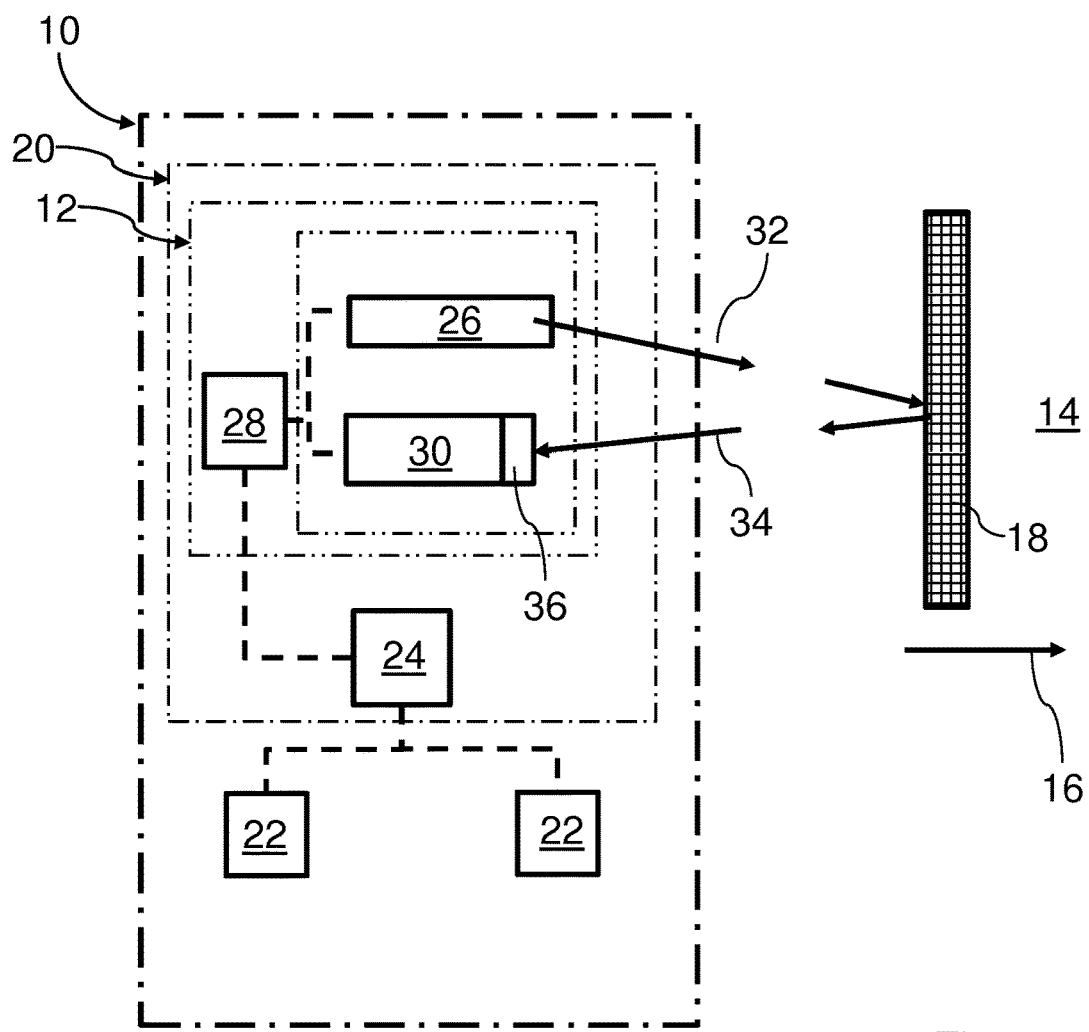
FIG. 2 shows schematically a functional diagram of the motor vehicle with the driver assistance system with the LiDAR system from FIG. 1.
Figure 4:
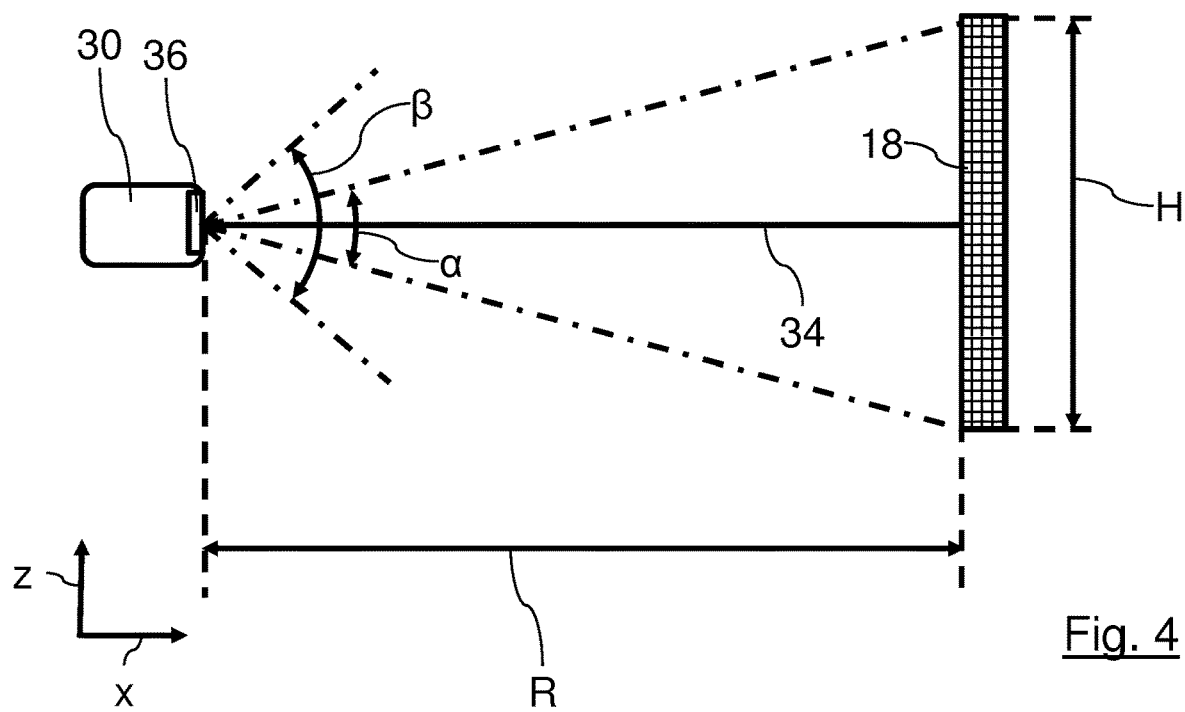
FIG. 4 shows schematically a side view of the receiving device of the LiDAR systems of FIGS. 1 and 2 when detecting an object in the far field.

In FIG. 1 a motor vehicle 10 in the form of a passenger car is shown in the front view. The motor vehicle 10 comprises an optical detection appliance in the form of a LiDAR system 12 by way of example. The LiDAR system 12 is disposed in the front bumper of the motor vehicle 10 by way of example. With the LiDAR system 12, a monitoring region 14 in front of the motor vehicle 10 in the direction of travel 16 can be monitored for objects 18. The LiDAR system 12 can also be disposed at other points on the motor vehicle 10 and can be oriented differently. The objects 18 can for example be other vehicles, persons, rocks, water pipes or other obstacles, such as also unevennesses in the road surface, in particular potholes. In FIGS. 2 and 4 in each case an object 18 is indicated as a checked rectangle by way of example. FIG. 2 is otherwise only a functional diagram of some of the components of the motor vehicle 10 that does not provide spatial orientation.

The LiDAR system 12 operates according to a light pulse transition time method. With the LiDAR system 12, a distance of the object 18 relative to the motor vehicle 10 can be determined. The LiDAR system 12 can for example be designed as a scanning system, for example as a so-called laser scanner, or as a so-called Flash-LiDAR system.

The LiDAR system 12 is part of a driver assistance system 20 or can at least be connected to the driver assistance system 20. With the driver assistance system 20, a driver of the motor vehicle 10 can be assisted. For example, the motor vehicle 10 can drive at least partly autonomously using the driver assistance system 20. With the driver assistance system 20, driving functions of the motor vehicle 10, for example an engine control function, a braking function or a steering function can be influenced, or indications or warning signals can be output. For this purpose, the driver assistance system 20 is connected to functional devices 22 for regulation and/or control. In FIG. 2 two functional devices 22 are represented by way of example. The functional devices 22 can for example be an engine control system, a brake system, a steering system, a chassis control arrangement or a signal output system.

The driver assistance system 20 comprises an electronic control device 24, with which suitable electronic control and regulation signals can be transmitted to the functional devices 22 and/or received from the functional devices 22 and processed.

The LiDAR system 12 comprises a transmitting device 26, an electronic control and analysis device 28 and a receiving device 30.

The control and analysis device 28 is connected to the control device 24 for signalling. With the control device 24, driving functions of the motor vehicle 10 can be controlled/regulated depending on object information of the LiDAR system 12. It is not significant for the invention whether electrical control and/or analysis appliances, such as for example the control device 24, the control and analysis device 28, an engine control unit of the motor vehicle 10 or similar, are integrated in one or more components or at least partly implemented as distributed components.

The transmitting device 26 comprises a light source, for example a laser, with which transmission signals in the form of light signals can be transmitted. With the light source pulsed optical transmission signals 32 can be transmitted into the monitoring region 14. The transmission signals 32 are reflected at the object 18 and sent back as correspondingly pulsed optical reception signals 34 to the receiving device 30. The distance of the object 18 is determined with the control and analysis device 28 from the light transition time, i.e. from the time between the transmission of a transmission signal 32 and the reception of the corresponding received signal 34.

Figure 3:
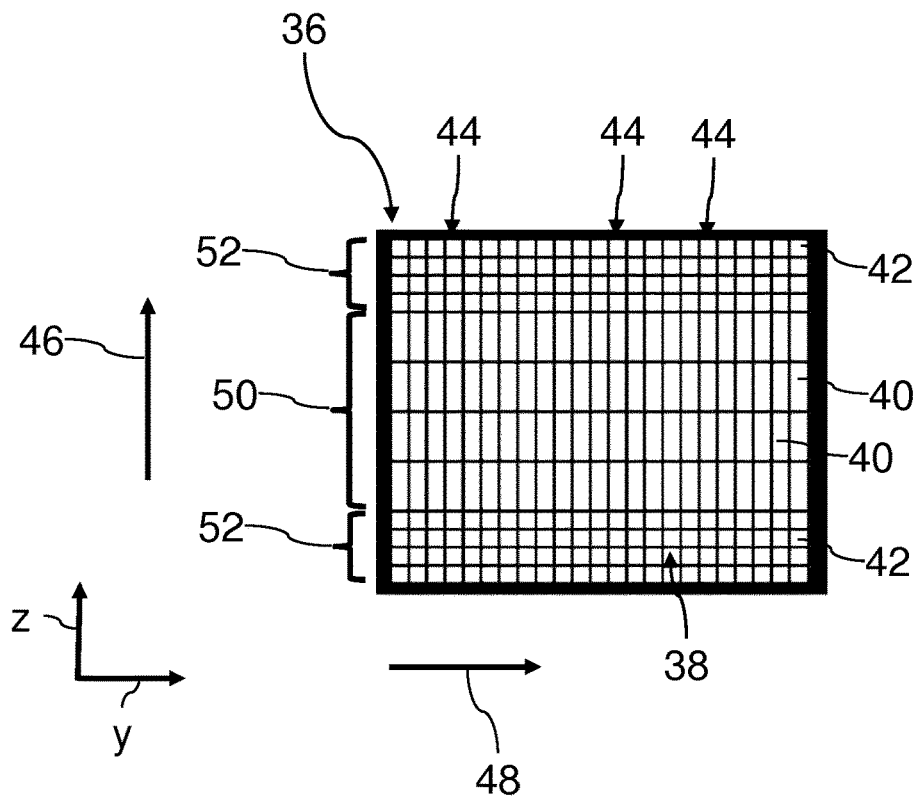
FIG. 3 shows schematically a front view of a sensor of the receiving device of the LiDAR systems from FIGS. 1 and 2.

In FIGS. 1, 3 and 4 the corresponding axes of an orthogonal x-y-z coordinate system are shown for better orientation. With the normal operating orientation of the motor vehicle 10 and the LiDAR systems 12, the x-y plane runs parallel to the plane of the roadway. In the case of a horizontally extending plane of the roadway, the x-y plane runs spatially horizontally. The z-axis runs perpendicular to the plane of the roadway, i.e. correspondingly spatially vertically. Where "horizontal" or "vertical" is mentioned below, this refers to the vehicle 10 or the LiDAR system 12 or the components thereof. This does not necessarily correspond to a spatially horizontal or spatially vertical orientation. The representations in FIGS. 1, 3 and 4 are otherwise not to linear or angular scale for better clarity.

The receiving device 30 comprises an electrooptical sensor 36 by way of example in the form of a two-dimensional CCD array, which is shown in FIG. 3 in the front view, looking from the monitoring region 14.

The sensor 36 comprises a detection surface 38 with a number of optical detection regions 40 and 42 in the form of image points, which are well known as "pixels". The detection regions 40 and 42 can be analysed individually. The detection surface 38 extends approximately parallel to the y-z plane.

The detection surface 38 is divided into 23 rows 44, each with 12 detection regions 40 and 42 by way of example. The rows 44 each extend along a first extension direction 46 that extends parallel to the z-axis. The rows 44 are disposed mutually adjacently when viewed in a second extension direction 48 that extends parallel to the y-axis.

The detection regions 40 and 42 are designed in two sizes by way of example and are referred to below as first, central detection regions 40 and as second, edge detection regions 42. In the first extension direction 46 the extents of the central detection regions 40 are significantly larger than the extents of the edge detection regions 42. In the second extension direction 48 the extents of the central detection regions 40 and the edge detection regions 42 are identical by way of example. As a result, the central detection regions 40 each comprise a larger active area for detecting photons than the respective edge detection regions 42.

Each of the rows 44 comprises four central detection regions 40 in the vertical centre of the detection surface 38. The central detection regions 40 are disposed directly adjacent to each other. The central detection regions 40 of the adjacent rows 44 form a central detection section 50 of the detection surface 38. The central detection section 50 extends horizontally between the two vertical side edges of the detection surface 38.

In addition to the upper horizontal edge and the lower horizontal edge of the sensor 36 in FIG. 3, four edge detection regions 42 are disposed immediately adjacent to each other in each row 44. The edge detection regions 42 of the mutually adjacent rows 44 form a total of two edge detection sections 52 of the detection surface 38. The edge detection sections 52 each extend horizontally between the two vertical side edges of the detection surface 38.

Respective angular resolutions in the central detection regions 40 are identical. Furthermore, respective angular resolutions in the edge detection regions 42 are identical. A ratio of the respective angular resolution of the central detection regions 40 to the respective angular resolution of the edge detection regions 42 is about 10 to 1 by way of example. The angular resolution in the central detection regions 40 is about 1° in each case by way of example. The angular resolution in the edge detection regions 42 is about 0.1° in each case by way of example.

In the central detection section 50 the received signals 34 from objects 18 in the far field are detected with sufficient resolution. Larger objects 18 such as for example vehicles or persons that are present in the far field can thus be detected. In the edge detection sections 52 the received signals 34 from objects 18 that are present in the near field can be detected with correspondingly higher resolution compared to the resolution of the central detection section 50. Even smaller objects, such as for example rocks, potholes or water pipes that are present in the near field can thus be detected. Distances in the range of a few meters are referred to as the near field in the sense of the invention, for example. The far field refers to longer distances for example up to 110 m.

In FIG. 4 by way of example a scenario is shown with an object 18 that is detected with the receiving device 30 in the far field. The representation is not to linear or angular scale in this case for better clarity. The receiving device 30 has an aperture angle β of for example 20°. The object is at a distance R of for example 110 m from the sensor 36 of the receiving device 30. The object 18 has an extent H of for example 2 m in the direction of the z-axis, i.e. in the first extension direction 46 of the sensor 36, and an extent of 1 m that is not shown in the direction of the y-axis, i.e. in the second extension direction 48 of the sensor 36. By way of example, $N_r$=517 photons per vertical row 44 are reflected by the object 18 to the sensor 36 as the received signal. With the distance R=110 m for a target angle α of a target field of view of the object 18 in the direction of the z-axis on sides of the sensor 36, the following mathematical relationship applies for trigonometric reasons:

$$\alpha = 2\tan^{-1}(0.5 \times H/R) = 2\tan^{-1}(0.5 \times 2\text{ m}/110\text{ m}) \approx 1.042°.$$

If the received signal 34 were to be incident in one of the edge detection sections 52 with the edge detection regions 42 with an angular resolution of 0.1°, the target angle α would therefore cover 1.042°/0.1°=10.42 edge detection regions 42. For the total number $N_r$=517 photons per vertical row 44, 517/0.42≈49 signal photons are then incident on each illuminated edge detection region 42.

In the central detection section 50 with the central detection regions 40, each of which comprises a respective angular resolution of 1°, the target angle α would cover 1.042°/1°=1.042 edge detection regions 42. With the total number of $N_r$=517 photons per vertical row 44, 517/1.042≈496 signal photons are incident on each illuminated central detection region 40.

For statistical reasons that are of no further interest, it is assumed that the minimum number $n_{min,pixel,pulse}$ of necessary signal photons that are required in order to be able to distinguish a signal from noise $N_{noise}$, for example the ambient light noise, is mathematically described by $$n_{min,pixel,pulse} = 4\sqrt{N_{noise}}$$

Measurements have shown that due to the ambient light about 248247 noise photons $N_{noise}$ per row 44 act on the sensor 36.

If a row 44 of the sensor 36 only consisted of 200 edge detection regions 42 each with an angular resolution of 0.1° for example, then about 248247/200≈1241 noise photons $N_{noise}$ would be incident on each edge detection region 42. According to the above relationship, a minimum number of necessary signal photons $n_{min,pixel,pulse} = 4\sqrt{1241} \approx 140$ would result. For the scenario shown in FIG. 4 with an object distance R=110 m, however, only about 49 signal photons would be incident on each of the edge detection regions 42. Therefore, no signal would be detected, as the signal-to-noise ratio is too low.

If instead a row 44 of the sensor 36 with the same dimensions in the direction of the z-axis exclusively consisted of 20 of the larger central detection regions 40 each with an angular resolution of 1° for example, then about 248247/20≈12412 noise photons $N_{noise}$ would be incident on each central detection region 40. According to the above relationship, a minimum number of necessary signal photons $n_{min,pixel,pulse} = 4\sqrt{12412} \approx 445$ would result. With the scenario shown in FIG. 4 about 496 signal photons would be incident on each of the central detection regions 40. By increasing the angular resolution for the central detection regions 40 in comparison to the edge detection regions 42 the signal-to-noise ratio is improved so that the number of signal photons is sufficient for detecting the signal. The central detection regions 40 with an angular resolution of 1° thus enable the object 18 described above with an extent H of 2 m parallel to the first extension direction 46 to be detected at a distance of 110 m.

The invention claimed is:

1. A receiving device for an optical detection appliance:
    wherein the receiving device is for receiving optical reception signals of a transmitting device of the detection appliance that are reflected from an object,
    wherein the receiving device comprises at least one optical sensor comprising at least one detection surface having at least one row with a number of optical detection regions extending along a first extension direction of the at least one detection surface,
    wherein at least two of the optical detection regions are analysed separately from each other for positional resolution of a received signal,
    wherein the respective extents of the at least two detection regions are different at least when viewed along the first extension direction,
    wherein each of the optical detection regions is a pixel,
    wherein an extent of at least one central detection region among the optical detection regions, with respect to the first extension direction, is greater in the vicinity of the centre of the at least one detection surface than an extent of at least one edge detection region among the optical detection regions that is closer to an edge of the detection surface compared to the at least one central detection region, and
    wherein the detection surface is divided into at least two sections, in which signals from objects that are different distances from the receiving device are detected, wherein the extent of corresponding detection regions in the sections for detecting objects at greater distances are larger than the extent of corresponding detection regions in sections for detecting closer objects.

2. The receiving device according to claim 1, wherein a ratio of an angular resolution in at least one first central detection region with a larger extent, to an angular resolution in at least one second edge detection region with a smaller extent, is between 12 to 1 and 8 to 1.

3. The receiving device according to claim 1, wherein at least one detection region is implemented with an image point and/or at least one detection region is made up of a plurality of image points.

4. The receiving device according to claim 1, wherein the at least one optical sensor is an electrooptical sensor.

5. An optical detection appliance comprising:
    at least one transmitting device for sending optical transmission signals; and
    at least one receiving device for receiving transmission signals reflected by an object as reception signals,
    wherein the at least one receiving device comprises:
        at least one optical sensor comprising at least one detection surface with at least one row extending along a first extension direction of the at least one detection surface with a number of optical detection regions,
    wherein at least two of the detection regions are analysed separately from each other for positional resolution of a received signal,
    wherein the respective extents of the at least two detection regions are different, at least when viewed along the first extension direction,
    wherein each of the optical detection regions is a pixel,
    wherein an extent of at least one central detection region among the optical detection regions, with respect to the first extension direction, is greater in the vicinity of the centre of the at least one detection surface than an extent of at least one edge detection region among the optical detection regions that is closer to an edge of the detection surface compared to the at least one central detection region, and
    wherein the detection surface is divided into at least two sections, in which signals from objects that are different distances from the receiving device are detected, wherein the extent of corresponding detection regions in the sections for detecting objects at greater distances are larger than the extent of corresponding detection regions in sections for detecting closer objects.

6. A driver assistance system for a vehicle, comprising:
at least one optical detection appliance; and
at least one electronic control device for controlling functional devices of the vehicle depending on information provided by the at least one detection appliance,
wherein the at least one detection appliance comprises:
  at least one transmitting device for sending optical transmission signals, and
  at least one receiving device for receiving transmission signals reflected from an object as reception signals,
wherein the at least one receiving device comprises at least one optical sensor comprising at least one detection surface with at least one row with a number of optical detection regions extending along a first extension direction of the at least one detection surface,
wherein at least two of the detection regions can be analysed separately from each other for positional resolution of a received signal,
wherein the respective extents of at least two detection regions are different, at least when viewed along the first extension direction,
wherein each of the optical detection regions is a pixel,
wherein an extent of at least one central detection region among the optical detection regions, with respect to the first extension direction, is greater in the vicinity of the centre of the at least one detection surface than an extent of at least one edge detection region among the optical detection regions that is closer to an edge of the detection surface compared to the at least one central detection region, and
wherein the detection surface is divided into at least two sections, in which signals from objects that are different distances from the receiving device are detected, wherein the extent of corresponding detection regions in the sections for detecting objects at greater distances are larger than the extent of corresponding detection regions in sections for detecting closer objects.

* * * * *